Figure 1:
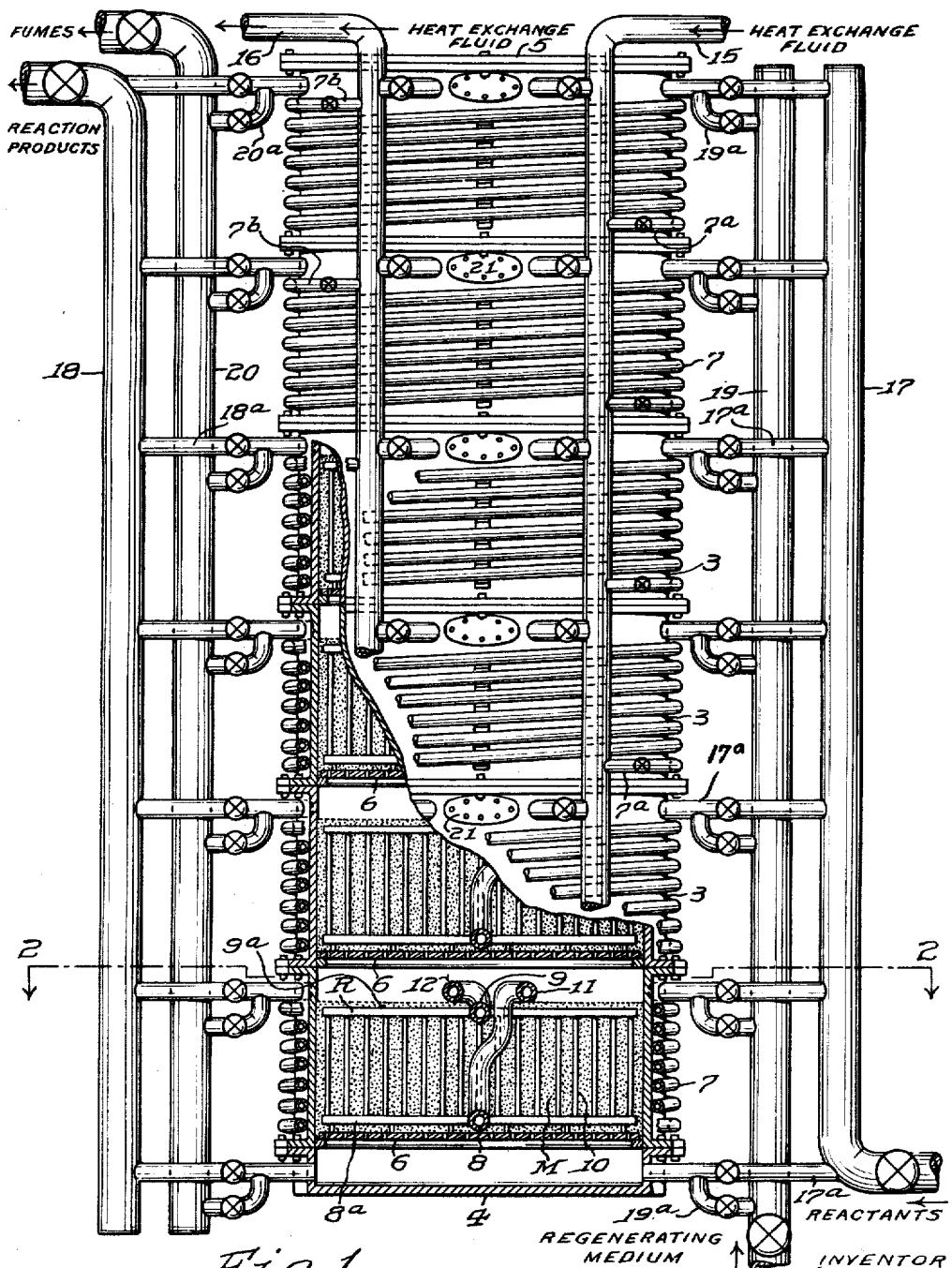

June 6, 1939.  E. J. HOUDRY  2,161,677
CATALYSIS
Filed Aug. 5, 1937  2 Sheets-Sheet 2

INVENTOR
Eugene J. Houdry.
BY Ira L. Nickerson
ATTORNEY

WITNESS
F. J. Hartman.

Patented June 6, 1939

2,161,677

UNITED STATES PATENT OFFICE 2,161,677

CATALYSIS

Eugène J. Houdry, Haverford, Pa., assignor to Houdry Process Corporation, Wilmington, Del., a corporation of Delaware Application August 5, 1937, Serial No. 157,475

12 Claims. (Cl. 196—52)

This invention relates to chemical reactions effected through or in the presence of contact masses which promote, enter into or merely present an extended surface area for the reaction. It is especially concerned with the use of catalysts having selective adsorptive properties capable of directing the extent and character of a reaction, and with the determination and control of operating conditions which will produce high or maximum yields of desired products. If the reaction involves side or secondary reactions which reduce the activity of the catalyst so that regeneration or reactivation of the latter is required, then suitable provision must be made for controlling the entire cycle of operation. While the invention relates generally to decomposition, conversion, metathesis, and synthesis of organic materials, it has special application to the treatment of hydrocarbons in natural or derived state such as natural gas, mineral oil, shale oil, carbonaceous material, distillates and derivates thereof and products therefrom.

One object of the invention is to utilize catalysts and contact masses under the best conditions or under conditions near to the best. Another object is to fix the limits or the ranges for the more important factors for superior results from the angles of yield and of economics. Another object is to establish the interrelation of certain factors to such an extent that when certain of them are known the optimum range of one or more of the others can be readily determined to produce high yields of desired products and an economical cycle of operation. Other objects will be apparent from the detailed description which follows.

In contacting operations for effecting chemical reactions, if we assume proper conditions of temperature and pressure, some of the essential and more important factors are the catalyst, the depth of bed or length of path of flow of reactants through the catalytic mass, the velocity of flow of reactants through the mass and over individual parts or pieces of the mass, and the rate of heat input or heat removal into or from the mass to control the reaction. If the catalyst loses activity during the reaction as by the deposit of contaminants therein and thereon so that regeneration is necessary in alternation with on-stream operation, other important factors include limitation of the quantity of reactant material subjected to the reaction during on-stream operation and of the quantity of reactants sent to each individual part or piece of the contact mass, and the speed and thoroughness of the regeneration so as to bring the cycle of operations and the apparatus requirements within economical limits. With any given catalyst and with any selected depth of bed or length of path of reactants therethrough within a specified range, the rate and velocity of reactants, their quantity per pass, etc., are readily determinable by the present invention.

In operations involving the treatment and conversion of hydrocarbons which produce contaminating deposits of a coky nature upon the catalyst, study and experimentation over a long period have demonstrated that the essentials for an operation which is commercially feasible include (a) Control of the coky deposit on the catalyst and (b) Good temperature control of the entire operation. For high yields it is essential that (1) The quantity of reactants per pass be limited and that (2) They be sent at proper velocity over the catalyst to effect a low coke make.

For fast regenerations the essentials comprise (1) Low coke deposit (2) Temperature control (3) Regenerating medium under pressure (4) Regenerating medium at proper rate and velocity.

The coky deposit on the catalyst is kept to a minimum only when a restricted quantity of reactants is sent at proper rate and velocity through a bed of catalyst of sufficient depth to give a time of contact which effects maximum conversion to desired products with a minimum of side and secondary reactions. This involves certain ranges which are so directly interrelated that changes in any given condition or range will require modification of other conditions or ranges, if the operation is to be conducted at or near its best. In most instances a satisfactory operation cannot be conducted when the on-stream part of the cycle lays down a coke deposit greater than 15 grams per liter of catalyst. For the highest yields the coke deposit should be considerably below 15 grams and should be reasonably uniform throughout the catalyst bed.

Accurate temperature control which is requisite for best yields and for speedy regenerations can be effected with catalysts which are poor conductors of heat (for example silicious catalysts) when there is a heat conducting wall within an inch of every part of the catalytic mass. Such walls may impart heat to the mass during endothermic reactions and remove heat during exothermic reactions. When two such reactions take place successively with the exothermic reaction at a higher temperature than the endothermic reactions (as in the catalytic conversion of higher boiling hydrocarbons into lower boiling hydrocarbons followed by regeneration of the catalyst by oxidation), a substantially uniform temperature on such walls at or near the endothermic reaction, or intermediate the temperature of the two reactions, as from 800 to 950° F., is very satisfactory, or temperatures which vary with the reaction but are kept within the range of about 750° to 1000° F.

The quantity of reactants sent into the catalytic zone during an on-stream period should not exceed 100% (liquid measure) of the volume of the contact mass. For the highest yields the liquid volume of reactants will usually be somewhat less than 50% of the volume of the catalyst.

Heretofore difficulties in regeneration have dictated a shallow depth of bed or short paths of flow within a bed. With the herein disclosed arrangement of heat conducting surfaces near all parts of the contact mass and with efficient heat exchange media such as fused salts, molten metals and alloys, etc. heat can be removed from (or imparted to) all parts of the mass so quickly that good heat control of masses up to at least fifteen feet in depth is now entirely feasible, both for regenerations and for on-stream reactions, exothermic or endothermic, and widely variant in degree of thermal intensity. A long path of flow in many instances permits a higher charging rate for the on-stream reaction with greater throughput and better yield. The greater the depth, however, the more pressure is required on the charge with a tendency to impair somewhat the quality of the products; also the regenerating period is lengthened. Hence for economies in equipment and in cycle it is important to select a depth of catalyst as low as possible for the quantity of charge available and desired yield. Beyond a fifteen foot depth of catalyst the yield falls off. Depths within the range of two to ten feet are desirable with a preference to the range from two to six feet. There is little or nothing to be gained in yield in depths above six feet and regenerations are lengthy. A highly satisfactory cycle from all points of view can be worked out with a catalyst bed or path of flow of the order of two to four feet.

Proper velocity of the reactant material through the contact mass is very important in effecting a high yield of the desired products and in minimizing side and secondary reactions. The depth of bed or path of flow within the contact mass has an important bearing upon the charging rate to the catalytic chamber. In general, the charging rate should be such that the apparent velocity of reactants in inches per second within the mass (computed on empty space) will lie within the range of from one-sixth to three times the depth of bed or path of flow therein. Up to a depth of six feet the range can be extended somewhat at both ends as from one-eighth to four times. Beyond a depth of six feet up to and including fifteen feet, the range tends to be more restricted, as from one-fifth to about two times the depth of bed. With an active catalyst and a path of movement of reactants of at least one foot and up to fifteen feet, a velocity of reactants of at least two-fifths of an inch per second should be maintained. It is usually preferable, however, to utilize a path of movement of at least one to two feet for treating and converting hydrocarbons and to limit the reaction period to not more than twenty minutes with a catalyst capable of converting at least 30% of the charge into the desired product or products, thereby insuring an operation at high efficiency. During regeneration, velocities of oxidizing media within the ranges indicated above will be utilized. Inasmuch as regenerating periods are unproductive, it is important to make them as short as possible. Hence rates of feed will be utilized giving maximum apparent velocities within the capacity of the heat exchange equipment to hold the catalytic mass at desired temperature or within safe limits. In most instances, it is possible to free the mass of contaminating deposits within a period equal to that of the on-stream operation, but the purging steps preliminary to and following the oxidizing operation as well as the cooling down period to restore the mass to on-stream temperature usually cause regeneration to consume up to about twice the time of the on-stream operation. Under such circumstances, three converters are required for continuous operation of the process, giving one converter on-stream while the other two are in regeneration; but it is possible to operate continuously with two converters if a high rate of feed is employed for regenerating reactants and a correspondingly lower rate and consequently smaller quantity of reactants are fed during the on-stream period.

While the oxidizing or regenerating reaction can be effected with air at atmospheric temperature and pressure, it is speeded up by heating the air or other medium and sending it through the converter under pressures above atmospheric. Temperatures of from 500 to 900° F. are suitable, with a preferential range of from 700 to 900° F., and pressures up to 200 lbs./sq. in. may be employed. Heat or energy or both may be recovered from the spent regenerating medium as indicated for example in the copending application of myself and R. S. Vose, Serial No. 58,858, filed January 13, 1936.

As a result of much study and experimentation it is now possible to determine operative conditions by using mathematical expressions establishing the relationship of yield and velocity of reactant vapors passing through a catalytic zone, also the relationship of yield, length of path and velocity of reactants. The most comprehensive of these expressions or formulae is $$Y \cong \frac{V+M}{V^2+O}$$

where

Y indicates yield of gasoline as a fraction;

V is the velocity of reactant vapors in inches per second; and

M and O are so-called constants which do not vary with changes in length of path or velocity separately, but which may have different magnitudes dependent upon the time of contact of the reaction stream with the catalyst, as set forth below.

The optimum velocity will be that which upon evaluation for various values of V in the expression $$\frac{V+M}{V^2+O}$$

gives a maximum value for Y for any set of values of the constants M and O. The determined value of M will be found in the range of 1 to 3 with O in the range of about 2.8 to 1800. For a preferred range of velocities, as up to about 30 inches per second, the values of M and O may be within the ranges of 1.5 to 2.8 and 2.8 to 460 respectively. In differentiating between charging stocks in the application of the above formula, the range of values for O should be divided into overlapping parts as follows: for lighter or more easily cracked charging stocks such as gas oils O should be given values in the range of 2.8 to 60 while for heavier or harder to crack stocks such as fuel oils, residues, etc. the range of values for O should preferably be 10 to 460.

The above formula can also be used in the form $$Y = K\frac{V+M}{V^2+O}$$

wherein the factor or constant K is concerned with the form and activity of the catalyst and the composition of the charge. Its value is within the range of .47 to 40 when Y is within the range of 30 to 50%.

When it is desired to consider the time of contact ($T_c$), and thereafter the length of path along with velocity, it is important to bear in mind that for any given charging rate the ratio of length of path in inches to velocity is constant $$\frac{L}{V} = \frac{1}{T_c}$$

For example, 8 volumes of gaseous charge per minute per volume of catalyst gives a value of 7½ to the ratio $$\frac{L}{V}$$

Once this ratio is established it is possible to determine the values of M and O by the following supplementary formulae $$M = 1.5 + 6.8\frac{V}{L}$$

and $$2.5\left(15\frac{V}{L}\right)^a = -M + \sqrt{M^2+O}$$

(*a* has values from 1.1 to 3, the lower values for light charging stocks and the higher values for heavy charging stocks)

The values thus determined can be substituted for M and O in the original formulae to solve for the range of conditions which will give the highest yields. It will be clear moreover that in solving for the conditions which give maximum yield use may be made of the expression $$\frac{dY}{dV} = \text{Zero.}$$

Figure 2:
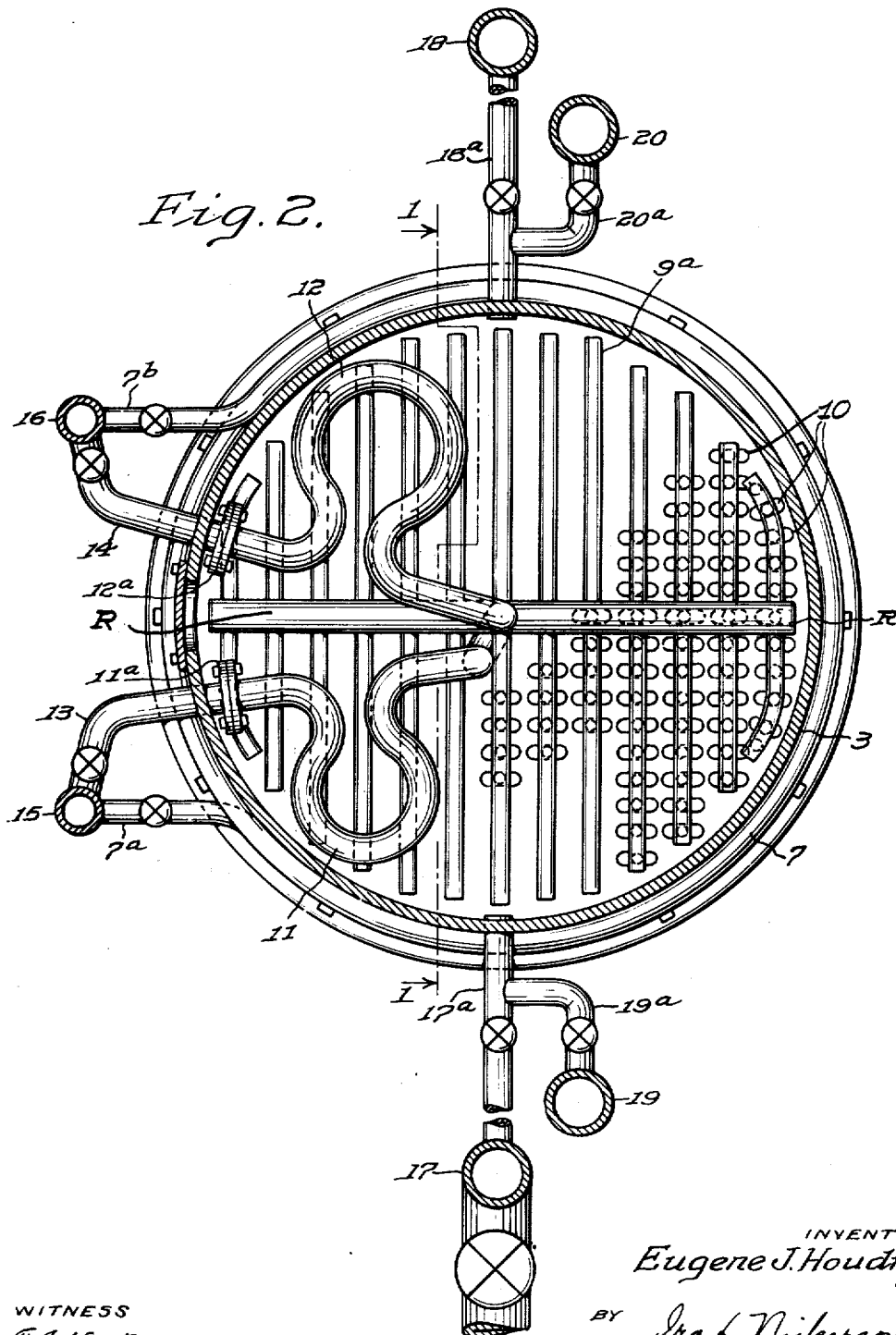

Apparatus of any known or suitable type may be utilized for practising the invention. The catalytic cases may provide for straight through flow of reactants or parallel or other form of flow within the catalytic mass itself. However, by way of illustration one concrete form of apparatus having a considerable degree of flexibility as to choice of length of path in the catalytic zone is shown in the accompanying drawings in which:

Fig. 1 is a side elevational view partly in vertical section at its lower end, as on the line 1—1 of Fig. 2, and partly broken away thereabove to indicate the internal construction; and Fig. 2 is an enlarged transverse sectional view substantially on the line 2—2 of Fig. 1, indication of contact mass and of certain parts of the radiator element being omitted for the sake of clearness.

In the drawings only a contact treating case or converter is illustrated, together with the lines for fluid necessary for its operation. All auxiliary apparatus such as heaters or stills, heat exchangers, fractionators, condensers, etc. have been omitted as well as many of the detachable joints, expansion bends, etc. required in a commercial unit, since they are not necessary to an understanding of the invention. The converter illustrated is sectional in character and adapted to be erected conveniently in any desired size. As shown, it comprises a plurality of open ended members 3 of annular or cylindrical or any other desired shape. These members may be flanged at their opposite ends or otherwise arranged for convenient attachment to one another. In the drawings six such sections 3 are shown mounted in superposition, the lowest section resting upon and being secured to a hollow closure member 4, while the top section has a cover or closure plate 5 secured thereto. Each section member 3 is provided on its interior and at its lower end with a perforated partition or grid member 6 which supports mass M, of contact or catalytic material, capable of effecting the desired transformation, conversion or treatment of the reactants fed thereto. The temperature of each mass M is controlled by heat exchange means, such as heat conductor or radiator member R resting upon grid 6 and embedded in the mass M. Additional heat control of each mass M is effected by temperature regulation of at least a part of the wall of each of sections 3. By preference, such part includes all portions of the walls of the sections which are in contact on their inner faces with mass M. A convenient way of regulating the temperature of the aforesaid parts of the walls of the sections 3 is to surround the same with pipe coil 7 through which the same or a different heat exchange fluid is circulated as for heat conductors or radiators R. With such an arrangement and with a suitable design of interior heat conductor or radiator member R, it will be apparent that every part of each contact mass can be at any desired distance from a heat conducting wall, which wall may be the enclosing wall of section 3, controlled by a coil 7, or a part of a heat conductor or radiator R, finned or otherwise.

The type of heat conductor or radiator R shown by way of illustration in Figs. 1 and 2, comprises a lower header 8 and an upper header 9, with transverse members 8a and 9a disposed in pairs in superposed relation and interconnected by a plurality of parallel vertically disposed conduits 10, members 8a, 9a and conduits 10 being preferably flattened or oval shaped to present a maximum of heat conducting and radiating surface. Supply lines 11 and 12 for lower and upper headers 8 and 9, respectively, extend above mass M in each of sections 3 and are detachably connected as at 11a and 12a to valved branches 13 and 14, respectively, which extend through the walls of sections 3 from supply line 15 and vent line 16 for the heat exchange fluid. Supply line 15 also has valved connections 7a to coils 7 which, in turn, have valved connections 7b to vent line 16.

Provision is made for supplying reactants either above or below each of contact masses M by valved branch lines 17a from supply line 17, and for withdrawing reaction products from below or above each of contact masses M by valved connections 18a from vent line 18. If the reaction is such as to produce a contaminating deposit upon catalytic masses M and if this deposit must be removed from time to time in order for the desired reaction to continue, then there will be a supply line 19 (Fig. 2) for cleansing or regenerating media, the valved branches 19a from which may join the branches 17a for reactants. Similarly, there will be a withdrawal line for the fumes or products of the regenerating reaction, such as line 20, having valved connections 20a joining valved connections 18a from reaction products line 18. As will be clear from Fig. 1, the lowermost branched connections such as 17a and 19a and 18a and 20a will connect with the shallow chamber in supporting closure member 4. In all other instances, the connections are made into the space above the contact mass M in each of sectional members 3, thus facilitating the assembly of the converter which is effected section by section from bottom to top. To permit inspection of the chambers above the contact masses, and especially to check the condition of joints 11a and 12a in the connections to radiators R, one or more openings are provided in the walls of each of sections 3, which openings may be sealed by bolted cover plates 21.

A sectional container of the type herein disclosed has a great variety of uses and is directly applicable to all operations requiring the use of any sort of contact material, whether it is mere inert spreading material, whether it is porous and only absorbent in character, or whether it presents a low or high degree of adsorptive power or catalytic activity. Likewise, the heat exchange fluid supplied by line 15 to coil 7 and/or radiator or heat conductor members R may be of any type which is fluid at the temperatures of operation. Hence the heat exchange medium may be gaseous, liquid or solid at atmospheric temperature. Some media which are gaseous, such as nitrogen or even air, are sufficient to control mild reactions, either endothermic or exothermic, which may be effected within the sectional container. When a more efficient medium is required materials which change state, such as water, mercury, diphenyl, etc. may be utilized. For moderately high temperature operations in which change of state is not desired, high boiling materials, such as fused salts, metals and metallic alloys, may be utilized.

For the conversion and treatment of hydrocarbons, as in the production of low boiling hydrocarbons of high quality from high boiling hydrocarbons, to which the present invention is especially but not exclusively directed, the contact masses M may be made up of bits, fragments, or molded pieces of silicious material, such for example, as active blends or compounds of silica and alumina of natural or artificial origin, with or without the addition of other active components, such as certain metals in finely divided form, including those of nickel, copper, cobalt, manganese, etc. as disclosed and claimed for example in my U. S. Patent Nos. 2,078,945 and 2,078,951 issued May 4, 1937. A good size and shape for such material is 2 mm. to 4 mm. molded plugs or pieces. Since such material is a relatively poor conductor of heat, efficient heat conductors or radiator members R will be required of the general type indicated in Figs. 1 and 2 and of such form as to dispose heat conducting surfaces within about ½" of every part of mass M, and at no point more than 1" from each such part. The heat exchange medium, which is by preference a molten metal or alloy or fused salts, will be circulated at a high rate through both the heat conductors or radiators R and the coils 7 at suitable temperature to control the reaction by supplying heat to or removing heat from the contact mass, for example by maintaining wall temperatures in the range of 750 to 1000° F. (preferably 800 to 950° F.) throughout the sectional converter or at least those portions of the latter which are in direct contact with the catalytic mass M. This is a good temperature range for controlling an endothermic transforming reaction to produce gasoline taking place in the range of 775 to 900° F. and the alternate exothermic regenerating reaction at somewhat higher temperature but usually not in excess of 1100° F.

A converter of the type shown in the drawings permits a considerable choice in the length of path of reactants through the contact mass or masses without requiring anything more than the manipulation of valves. For example admitting reactants at top or bottom and venting reaction products from the opposite end in a straight-through operation gives a length of path of 6 feet, if each of masses M is one foot deep, or of 12 feet, if each of the masses is two feet deep. Admitting reactants at the center of the converter and venting products at both ends, or sending the reactants in at both ends and venting at the center, would give paths of 3 or 6 feet depending upon whether the individual masses are one foot or two feet in depth. It is further apparent that a six section converter can be operated with depths of bed of one foot or two feet (if each section has a mass of one foot depth) or of two or four feet (when the individual masses M are two feet in depth). Other combinations are readily arranged as may be desired or required by the type of reaction and character of the contact mass. Regeneration may be effected with the same or a different depth of bed as compared with the on-stream reaction. When regeneration is by oxidation wherein the burning progresses in the form of a wave, it is preferable to effect the regeneration simultaneously in each of masses M so as to take advantage of the lowest depth of bed and thus speed up this unproductive reaction as much as possible.

To utilize the invention for the conversion of hydrocarbons a refiner will first determine how much and what kind of material he has available as charging stock and select a quantity of catalyst to promote the conversion, which quantity will preferably be more than twice the volume (liquid) of charge to be sent into the reaction chamber in a single on-stream period ranging up to twenty minutes in length. Suppose he has a long residuum from a typical American crude or blend of crudes as charging stock and decides to use a volume of catalyst equivalent to approximately five volumes of charge for a reaction to be conducted at 825° F. under a pressure of 15 lbs. per square inch gage with 17.5% by weight of steam for an on-stream period of fifteen minutes. These conditions give a vapor charging rate per volume of catalyst of about 4.1 per minute and a value of 14.5 for $$\frac{L}{V}$$

If the operator is in doubt as to the value of $a$ which he must use for his particular charging stock, he must at this time make two or three laboratory test runs which will determine $a$ exactly for him. However, for a long residuum such as this, the value would not be far from 3. He is then in a position to substitute in a supplementary formulae $$M = 1.5 + 6.8\frac{V}{L}$$

and $$2.5\left(15\frac{V}{L}\right) = -M + \sqrt{M^2 + O}$$

to get M=1.97 and O=18.6. These values for M and O are substituted in the equation for Y and by the process of differentiation or by graphic representation the optimum velocity is found to be 2.78 inches per second. Then substituting in $$\frac{L}{V} = 14.5$$

the optimum length of path is found to be about 40 inches or 3.3 feet. The refiner can accordingly use a converter such as shown in Figs. 1 and 2 under optimum conditions by sending his charge into the center of the converter and venting at both ends, or charging to the ends and venting in the center when the mass M in each of sections 3 is 13 inches in depth to give a total depth of 39 inches for each group of three sections or masses.

Only when actual yields are to be established is it necessary to set up a value for K. Such values are usually a function of $$\frac{L}{V}$$

varying with the activity of the catalyst and the susceptibility of the charging stock, and readily established by simple laboratory experiments. For example, if the refiner uses as his catalyst an activated hydrosilicate of alumina having a composition substantially as disclosed in U. S. Patent No. 2,078,945 issued to me on May 4, 1937, K would have the value $$2\left(15\frac{V}{L}\right)^{1.1}$$

and the optimum yield of high octane 400° end point gasoline in the above example would be about 39%.

If the refiner has light gas oil for charging stock, he can use a smaller volume of catalyst such as the equivalent of approximately three volumes (liquid) of charge for a reaction to be conducted at 850° F. under a gage pressure of 30 lbs. per square inch with 5% by weight of steam for an on-stream period of fifteen minutes. The volume of vaporized charge to volume of catalyst is then about 2.4 per minute which gives a value of about 25 for $$\frac{L}{V}$$

He then substitutes this value in the supplementary formulae $$M = 1.5 + 6.8\frac{V}{L}$$

and $$2.5\left(15\frac{V}{L}\right)^{1.1} = -M + \sqrt{M^2 + O}$$

to get M=1.77 and O=6.9. Then by either of the methods indicated in the previous example the optimum velocity is found to be 1.42 inches per second and the optimum length of path 35 inches or approximately three feet. Using the same type of catalyst as in the first example the value for K is $$.95\left(40\frac{V}{L}\right)^{.5}$$

The yield of condensed high octane gasoline under the above conditions is 42%.

The coky or other burnable deposit on the catalyst is an important factor in determining the ratio of volume of catalyst to volume of oil charged and in determining the length of the on-stream period. As previously stated such deposit must be below 15 grams per liter of catalyst to secure maximum yields while reducing the regenerative periods to forty minutes or less. In the first example, in which heavy material was charged, the deposit was about 10 grams and for the lighter charge in the second example the deposit was about 5 grams. In both instances the on-stream periods were 15 minutes and the regenerating periods 30 minutes, giving a 45 minute cycle. If the operating conditions are set to produce a coke deposit below 5 grams, a cycle of 30 minutes, with on-stream and regenerating periods of equal duration, is easily attained with the present invention. Inasmuch as light charging stocks tend to crack gasoline more easily than heavy stocks in the above described catalytic operations, higher charging rates may be used for the former resulting in generally higher yields. The formulae as set up include in the charge 5% by weight of steam, or the equivalent of other diluent gases, for light charging stocks, and 17.5% for heavy charging stocks since such quantities are suitable for reactions promoted by active catalysts of a silicious nature. If the amounts of steam or equivalent diluents are varied, this fact will of course be involved in determining values for the variables. The term velocity wherever used herein is that of entrance gases.

Apparatus as disclosed herein is claimed in my copending divisional application Serial No. 269,919, filed April 25, 1939.

I claim as my invention:

1. In the transformation or treatment of hydrocarbons in the production of gasoline by the action of a catalytic mass which is alternately on stream and in regeneration the process steps which comprise sending the hydrocarbons under reaction conditions into contact with the catalyst, controlling the reaction so as to limit the deposit of carbonaceous and other poisonous material on the catalyst during an on-stream period to less than 15 grams per liter of catalyst, maintaining all parts of the mass at not more than one inch from a heat conducting member, and supplying heat to or removing heat from said member so as to maintain the latter in the temperature range of 750 to 1000° F. during both the on-stream and regenerating periods.

2. In the transformation of hydrocarbons to produce a high yield of high quality gasoline by the action of a contact mass which is highly active and has selective adsorptive qualities the process steps which comprise sending the hydrocarbons under reaction conditions into and through the contact mass, limiting the quantity of hydrocarbons sent through the mass to not more than 100% (liquid measure) of the volume of contact mass, disposing a heat conducting member within one inch of every part of the contact mass, and supplying heat to such member or members at such rate as to maintain the member or members at a predetermined temperature within the range of 800 to 950° F.

3. In the transformation of hydrocarbons to produce a high yield of high quality gasoline by the action of a contact mass which is highly active and has selective adsorptive qualities the process steps which comprise sending the hydrocarbons under reaction conditions into and through the contact mass at an optimum velocity determined by the equation $$Y = K\frac{V+M}{V^2+O}$$

wherein Y is yield expressed as a fraction, V is the velocity of the entering reactants and M and O are determinable constants within the ranges respectively of 1 to 3 and 2.8 to 1800, limiting the quantity of hydrocarbons sent through the mass to less than 50% (liquid measure) of the volume of contact mass, and continuously supplying heat to all parts of the mass to maintain it within the temperature range of 775° to 900° F.

4. Process of transforming heavier or higher boiling hydrocarbons to produce gasoline of high quality which comprises sending the higher boiling hydrocarbons in vapor phase and under reaction conditions into and through a bed of silicious material of high activity and selective adsorptive properties and capable of promoting the desired reaction, the path of movement of the vaporized charge through said bed being at least one foot in length and not in excess of fifteen feet, maintaining an apparent velocity of vapors entering said bed of at least ⅔ inch per second and not exceeding 60 inches per second, and stopping the operation before the deposit of carbonaceous and other poisonous material on the catalyst exceeds 15 grams per liter of catalyst.

5. Process of transforming heavier or higher boiling hydrocarbons to produce gasoline of high quality which comprises sending the higher boiling hydrocarbons in vapor phase and under reaction conditions into and through a bed of silicious material of high activity and selective adsorptive properties and capable of promoting the desired reaction, the path of movement of the vaporized charge through said bed being at least one foot in length and not in excess of fifteen feet, maintaining an apparent velocity of vapors entering said bed of at least ⅔ inch per second and not exceeding 60 inches per second, stopping the operation before the deposit of carbonaceous and other poisonous material on the catalyst exceeds 15 grams per liter of catalyst, and preventing a drop of temperature in the contact material by adding heat to the latter through heat conducting surfaces at not more than one inch from every part of the contact material.

6. Process of producing a high yield of high quality gasoline from heavier hydrocarbons which comprises subjecting the charge under reaction conditions to the action of at least a two foot depth but not exceeding a fifteen foot depth of silicious contact material of high activity and capable of promoting the desired reaction, and sending only a limited quantity of the charge through the contact material and within a limited period, the quantity being not in excess of 50% (liquid measure) of the volume of the contact material and the period being not in excess of 20 minutes.

7. Process of producing a high yield of high quality gasoline which comprises subjecting a suitable charge under reaction conditions to the action of at least a two foot depth but not exceeding a fifteen foot depth of silicious contact material of high activity and capable of promoting the desired reaction, sending only a limited quantity of the charge through the contact material and within a limited period, the quantity being not in excess of 50% (liquid measure) of the volume of the contact material and the period being not in excess of 20 minutes, regenerating the contact material in situ in preparation for another conversion period by burning the contaminants deposited in the contact material within a period not exceeding twice that given above, and controlling the temperature of the contact material during the cycle of operation by heat conducting surfaces disposed within one inch of every part of the contact material.

8. Process of producing a high yield of high quality gasoline from heavier hydrocarbons, which comprises subjecting the charge under reaction conditions to the action of at least a one foot depth but not exceeding a fifteen foot depth of silicious contact material of high activity and capable of promoting the desired reaction, sending only a limited quantity of the charge through the contact material and within a limited period, the quantity being not in excess of 50% (liquid measure) of the volume of the contact material and the period being not in excess of 20 minutes, regenerating the contact material by sending therethrough under reaction conditions air as an oxidizing medium under pressure of at least 15 lbs. per square inch for not more than 20 minutes, and controlling the temperature of the contact material by adding heat during converting periods and removing heat during regenerating periods through heat conducting surfaces disposed within an inch of every part of the contact material.

9. Process of making a high yield of light hydrocarbons in the gasoline boiling range of high octane number from heavier hydrocarbons which comprises vaporizing the hydrocarbon charge without thermal decomposition of the same, sending the vaporized material through a reaction zone charged with catalytic material having selective adsorptive properties and comprising essentially a blend of silica and alumina in small pieces of substantially uniform size, maintaining an optimum velocity V of the vaporized material through the catalytic material determined by the formula $$Y = K\frac{V+M}{V^2+O}$$

the effective depth L of the catalytic material through which the hydrocarbon vapors pass being not less than one foot nor more than 10 feet to produce conversion or yield Y of from 30 to 50% of the charge into condensible gasoline, K being a constant with a value of from .47 to 40, fixing the operating conditions including the length of the run so as to limit the deposit of carbonaceous and other poisonous material in the catalyst to less than 15 grams per liter of catalyst thereby establishing a value for the ratio $$\frac{L}{V}$$

and then solving for values of M and O in the supplementary equations $$M = 1.5 + 6.8\frac{V}{L}$$

and $$2.5\left(15\frac{V}{L}\right)^s = -M + \sqrt{M^2 + O}$$

(s ranging from 1.1 to 3)

for substitution back in first formula to determine yield Y.

10. In a process for producing gasoline from heavier hydrocarbons the steps which comprise passing during alternate periods a current of vaporized heavier hydrocarbons and a stream of air over a catalytic mass comprising essentially silica and alumina in pieces of substantially uniform size, the mass keeping a high activity during the on-stream or hydrocarbon period in spite of the formation of a coky deposit therein and thereon and being restored to activity by removal of such deposit during the regenerative or air period, shifting from on-stream to regenerative periods before the coky deposit exceeds 15 grams per liter of catalyst, and controlling the temperature of the contact mass during both periods by providing heat conducting surfaces within less than one inch of all parts of the mass and by utilizing such surfaces within the range of 750 to 1000° F. to supply heat to the mass during the on-stream periods and to remove heat therefrom during the regenerative periods.

11. Process of producing high yields of high octane gasoline from heavier hydrocarbons by short runs on and rapid regenerations of a contact mass comprising a highly adsorptive blend of silica and alumina in small pieces of substantially uniform size arranged to be alternately on stream and in regeneration, the process comprising passing hydrocarbon vapors and subsequently regenerative media under reaction conditions through the contact mass in a path of at least one foot in length and not exceeding fifteen feet, maintaining the apparent velocity of movement of both the entering vapors and the media in the range of ⅔ to 60 inches per second, supplying heat during the on stream periods and removing heat during the regenerating periods by heat conducting surfaces within one inch of every part of the contact mass, and effecting a complete cycle of operations including purging of the contact mass in less than sixty minutes so as to utilize the contact mass under the best conditions.

12. In the cycle of operation of a catalyst utilized alternately on stream and in regeneration for promoting chemical reactions during which a burnable deposit accumulates on the catalyst and in which the reactants pass through an extended bed of catalyst not exceeding fifteen feet in depth, the process steps of controlling the operating conditions and the length of the on-stream run so as to limit the burnable deposit to less than 15 grams per liter of catalyst, sending an oxidizing medium through the catalyst bed at a velocity in the range of ⅔ to 60 inches per second and under pressure in excess of 25 pounds per square inch, and removing excess heat from the bed of catalyst by a circulated heat exchange medium and by heat conducting surfaces controlled by the latter and disposed not more than one inch from any portion of the catalyst.

EUGÈNE J. HOUDRY.

Certificate of Correction

Patent No. 2,161,677.

June 6, 1939.

EUGÈNE J. HOUDRY

It is hereby certified that error appears in the printed specification of the above numbered patent requiring correction as follows: Page 5, first column, line 10, in the equation, for $$"2.5\left(15\frac{V}{L}\right)="$$ read $$2.5\left(15\frac{V}{L}\right)^2=;$$

and that the said Letters Patent should be read with this correction therein that the same may conform to the record of the case in the Patent Office.

Signed and sealed this 18th day of July, A. D. 1939.

[SEAL]

HENRY VAN ARSDALE,
*Acting Commissioner of Patents.* for substitution back in first formula to determine yield Y.

10. In a process for producing gasoline from heavier hydrocarbons the steps which comprise passing during alternate periods a current of vaporized heavier hydrocarbons and a stream of air over a catalytic mass comprising essentially silica and alumina in pieces of substantially uniform size, the mass keeping a high activity during the on-stream or hydrocarbon period in spite of the formation of a coky deposit therein and thereon and being restored to activity by removal of such deposit during the regenerative or air period, shifting from on-stream to regenerative periods before the coky deposit exceeds 15 grams per liter of catalyst, and controlling the temperature of the contact mass during both periods by providing heat conducting surfaces within less than one inch of all parts of the mass and by utilizing such surfaces within the range of 750 to 1000° F. to supply heat to the mass during the on-stream periods and to remove heat therefrom during the regenerative periods.

11. Process of producing high yields of high octane gasoline from heavier hydrocarbons by short runs on and rapid regenerations of a contact mass comprising a highly adsorptive blend of silica and alumina in small pieces of substantially uniform size arranged to be alternately on stream and in regeneration, the process comprising passing hydrocarbon vapors and subsequently regenerative media under reaction conditions through the contact mass in a path of at least one foot in length and not exceeding fifteen feet, maintaining the apparent velocity of movement of both the entering vapors and the media in the range of ⅖ to 60 inches per second, supplying heat during the on stream periods and removing heat during the regenerating periods by heat conducting surfaces within one inch of every part of the contact mass, and effecting a complete cycle of operations including purging of the contact mass in less than sixty minutes so as to utilize the contact mass under the best conditions.

12. In the cycle of operation of a catalyst utilized alternately on stream and in regeneration for promoting chemical reactions during which a burnable deposit accumulates on the catalyst and in which the reactants pass through an extended bed of catalyst not exceeding fifteen feet in depth, the process steps of controlling the operating conditions and the length of the on-stream run so as to limit the burnable deposit to less than 15 grams per liter of catalyst, sending an oxidizing medium through the catalyst bed at a velocity in the range of ⅖ to 60 inches per second and under pressure in excess of 25 pounds per square inch, and removing excess heat from the bed of catalyst by a circulated heat exchange medium and by heat conducting surfaces controlled by the latter and disposed not more than one inch from any portion of the catalyst.

EUGÈNE J. HOUDRY.

Certificate of Correction

Patent No. 2,161,677.

June 6, 1939.

EUGÈNE J. HOUDRY

It is hereby certified that error appears in the printed specification of the above numbered patent requiring correction as follows: Page 5, first column, line 10, in the equation, for $$"2.5\left(15\frac{V}{L}\right)="\qquad \text{read} \qquad 2.5\left(15\frac{V}{L}\right)^2=;$$

and that the said Letters Patent should be read with this correction therein that the same may conform to the record of the case in the Patent Office.

Signed and sealed this 18th day of July, A. D. 1939.

[SEAL]

HENRY VAN ARSDALE,
*Acting Commissioner of Patents.*